United States Patent
He et al.

(10) Patent No.: US 9,451,608 B2
(45) Date of Patent: Sep. 20, 2016

(54) RESOURCE CONFIGURATION METHOD, RESOURCE DELETION METHOD AND DEVICE

(71) Applicant: CHENGDU TD TECH LTD., Chengdu (CN)

(72) Inventors: Gang He, Chengdu (CN); Chen Fan, Chengdu (CN); Mingchun Li, Chengdu (CN); Zhihong Zhou, Chengdu (CN); Haijian Shi, Chengdu (CN); Naihua Yuan, Chengdu (CN); Hongmei Gao, Chengdu (CN); Minghua Wei, Chengdu (CN)

(73) Assignee: CHENGDU TD TECH LTD., Chengdu (CN)

(*) Notice: Subject to any disclaimer, the term of this patent is extended or adjusted under 35 U.S.C. 154(b) by 0 days.

(21) Appl. No.: 14/615,358

(22) Filed: Feb. 5, 2015

(65) Prior Publication Data
US 2015/0189631 A1    Jul. 2, 2015

Related U.S. Application Data

(63) Continuation of application No. PCT/CN2012/085095, filed on Nov. 23, 2012.

(30) Foreign Application Priority Data

Aug. 8, 2012    (CN) .......................... 2012 1 0280863

(51) Int. Cl.
*H04W 72/00* (2009.01)
*H04W 72/04* (2009.01)
(Continued)

(52) U.S. Cl.
CPC .......... *H04W 72/042* (2013.01); *H04L 5/0098* (2013.01); *H04L 65/4061* (2013.01); *H04W 4/08* (2013.01); *H04W 4/021* (2013.01); *H04W 4/028* (2013.01)

(58) Field of Classification Search
CPC ... H04W 72/042; H04W 4/08; H04W 4/021; H04W 4/028; H04W 5/0098; H04W 65/4061

USPC ....... 455/450, 452.1, 452.2, 418, 419, 435.1
See application file for complete search history.

(56) References Cited

U.S. PATENT DOCUMENTS

| 2006/0111135 A1 | 5/2006 | Gray et al. ..................... 455/519 |
| 2006/0277296 A1* | 12/2006 | Matsubara .............. H04L 67/14 709/224 |

(Continued)

FOREIGN PATENT DOCUMENTS

| CA | 2 790 057 A1 | 9/2011 |
| CN | 101087447 A | 12/2007 |

(Continued)

OTHER PUBLICATIONS

International Search Report of corresponding International PCT Application No. PCT/CN2012/085095, dated May 16, 2013.

(Continued)

*Primary Examiner* — Khai M Nguyen
(74) *Attorney, Agent, or Firm* — J.C. Patents

(57) ABSTRACT

The present invention provides a resource configuration method, a resource deletion method and a device. The resource configuration method includes: receiving a group establishment request carrying a group identifier of a group to be established; acquiring, according to the group identifier of the group to be established, a base station list and a tracking area list of the group to be established; the base station list includes a base station in which a registered subscription user equipment of the group to be established locates at present, the tracking area list includes a tracking area in which the registered subscription user equipment of the group to be established locates at present; if the base station list is not empty, configuring, according to the base station list and the tracking area list, a resource for the group to be established.

19 Claims, 6 Drawing Sheets

(51) Int. Cl.
*H04W 4/08* (2009.01)
*H04L 5/00* (2006.01)
*H04L 29/06* (2006.01)
*H04W 4/02* (2009.01)

(56) References Cited

U.S. PATENT DOCUMENTS

| | | | | |
|---|---|---|---|---|
| 2008/0280620 | A1* | 11/2008 | Chin | H04W 48/08 455/446 |
| 2010/0061308 | A1* | 3/2010 | Becker | H04W 60/04 370/328 |
| 2010/0112980 | A1* | 5/2010 | Horn | H04W 48/20 455/411 |
| 2010/0210288 | A1* | 8/2010 | Kim | H04W 68/02 455/458 |
| 2012/0238208 | A1* | 9/2012 | Bienas | H04W 8/24 455/41.2 |

FOREIGN PATENT DOCUMENTS

| | | |
|---|---|---|
| CN | 101772198 A | 7/2010 |
| CN | 102111722 A | 6/2011 |
| CN | 102118796 A | 7/2011 |
| CN | 102123460 A | 7/2011 |
| CN | 102149048 A | 8/2011 |

OTHER PUBLICATIONS

The supplementary European Search Report of corresponding European patent application No. 12882615.3 and corresponding international PCT application No. PCT/CN2012/085095, dated Jun. 19, 2015.

* cited by examiner

RESOURCE CONFIGURATION METHOD, RESOURCE DELETION METHOD AND DEVICE

CROSS-REFERENCE TO RELATED APPLICATIONS

This application is a continuation of International Application No. PCT/CN2012/085095, filed on Nov. 23, 2012, which claims priority to Chinese Patent Application No. 201210280863.X, filed on Aug. 8, 2012, entitled "RESOURCE CONFIGURATION METHOD, RESOURCE DELETION METHOD AND DEVICE", which are hereby incorporated by reference in their entireties.

TECHNICAL FIELD

The present invention relates to the field of cluster technologies and, in particular, to a resource configuration method, a resource deletion method and a device.

BACKGROUND

A digital cluster communication system is a specific mobile communication system, in which a resource is shared among group users. In the digital cluster communication system, a network side needs to allocate a corresponding group resource for each group, so that each group performs group allocation by using the allocated group resource.

In the current digital cluster communication system, a scheduling area is usually preset for each group according to a conventional activity area of the group user in the group. The scheduling area includes a plurality of cells whose geographical locations are adjacent. When establishing the group, the network side merely allocates and establishes a resource relevant to the group inside the scheduling area, but does not allocate a resource for a cell outside the scheduling area.

When adopting the aforementioned manner to perform the group resource allocation, since the resource is allocated according to the preset scheduling area, if the scheduling area is set to be too small, then the group user locating outside the scheduling area cannot access the group; if the scheduling area is set to be too large, then it is possible that a resource is still established in some cells having no user, thereby leading to a waste of system resources. Therefore, at present, there is no resource configuration method which can not only ensure that the group user accesses the group successfully but also avoid the resource waste.

SUMMARY

Aiming at the deficiencies of prior art, the present invention provides a resource configuration method, a resource deletion method and a device, so as to not only ensure that a group user accesses a group successfully but also avoid resource waste.

A first aspect of the present invention provides a resource configuration method, including:

receiving a group establishment request, the group establishment request carries a group identifier of a group to be established;

acquiring, according to the group identifier of the group to be established, a base station list of the group to be established and a tracking area list of the group to be established; where the base station list of the group to be established includes a base station in which a registered subscription user equipment of the group to be established locates at present, the tracking area list of the group to be established includes a tracking area in which the registered subscription user equipment of the group to be established locates at present;

if the base station list of the group to be established is not empty, configuring, according to the base station list of the group to be established and the tracking area list of the group to be established, a resource for the group to be established.

A second aspect of the present invention provides a resource configuration method, including:

receiving a group joining request, the group joining request carries a group identifier of a group to be joined, and an identifier of a user equipment requesting to join the group to be joined;

if judging and learning, according to the group identifier of the group to be joined, that the group to be joined is in an activated state, acquiring, according to the identifier of the user equipment, a base station and a tracking area in which the user equipment locates at present;

if judging and learning that a group resource of the group to be joined is not configured in the base station or the tracking area in which the user equipment locates at present, executing a corresponding resource configuration.

A third aspect of the present invention provides a resource configuration method, including:

receiving an update notification message that a user equipment moves from a first tracking area of a first base station to a second tracking area of a second base station, the update notification message carries a group identifier of a subscription group of the user equipment, an identifier of the first tracking area and an identifier of the second tracking area;

if judging and learning, according to the group identifier of the subscription group, that the subscription group is in an activated state, judging whether a group resource of the subscription group is configured in the second base station and the second tracking area or not, if not, executing a corresponding resource configuration.

A fourth aspect of the present invention provides a resource deletion method, including:

receiving group idle resource judgment triggering information;

judging, according to the group idle resource judgment triggering information, whether there exists a group idle resource or not;

if there exists, releasing the group idle resource.

A fifth aspect of the present invention provides a resource configuration device, including:

an establishment request receiving module, configured to receive a group establishment request, the group establishment request carries a group identifier of a group to be established;

a list acquiring module, configured to acquire, according to the group identifier of the group to be established, a base station list of the group to be established and a tracking area list of the group to be established; where the base station list of the group to be established includes a base station in which a registered subscription user equipment of the group to be established locates at present, the tracking area list of the group to be established includes a tracking area in which the registered subscription user equipment of the group to be established locates at present;

a first resource configuring module, configured to: if the base station list of the group to be established is not empty, configure, according to the base station list of the group to be established and the tracking area list of the group to be established, a resource for the group to be established.

A sixth aspect of the present invention provides a resource configuration device, including:

a joining request receiving module, configured to receive a group joining request, the group joining request carries a group identifier of a group to be joined, and an identifier of a user equipment requesting to join the group to be joined;

a location acquiring module, configured to: if judging and learning, according to the group identification of the group to be joined, that the group to be joined is in an activated state, acquire, according to the identifier of the user equipment, a base station and a tracking area in which the user equipment locates at present;

a second resource configuring module, configured to: if judging and learning that a group resource of the group to be joined is not configured in the base station or the tracking area in which the user equipment locates at present, execute a corresponding resource configuration.

A seventh aspect of the present invention provides a resource configuration device, including:

an update notification receiving module, configured to receive an update notification message that a user equipment moves from a first tracking area of a first base station to a second tracking area of a second base station, the update notification message carries a group identifier of a subscription group of the user equipment, an identifier of the first tracking area and an identifier of the second tracking area;

a third resource configuring module, configured to: if judging and learning, according to the group identifier of the subscription group, that the subscription group is in an activated state, judge whether a group resource of the subscription group is configured in the second base station and the second tracking area, if not, execute a corresponding resource configuration.

An eighth aspect of the present invention provides a resource deletion device, including:

a judgment triggering module, configured to receive group idle resource judgment triggering information;

a judging module, configured to judge, according to the group idle resource judgment triggering information, whether there exists a group idle resource or not;

a resource releasing module, configured to release the group idle resource if there exists the group idle resource.

According to the resource configuration method, the resource deletion method and the device of the present invention, in responding to a group establishment request to configure a group resource, an eNB list which includes the base station (eNB) in which the registered subscription user equipment of the group to be established locates at present, and a TA list which includes the tracking area (TA) in which the registered subscription user equipment of the group to be established locates at present are acquired according to the group identifier of the group to be established, and the group resource is configured according to the eNB list and the TA list, thereby not only ensuring that the registered subscription UE of the group to be established can access the group successfully, but also avoiding the resource waste resulted from configuring a resource for an eNB or a TA which does not include a registered subscription UE, thus realizing a dynamic resource configuration based on the registered subscription UE.

DESCRIPTION OF EMBODIMENTS

Figure 1:
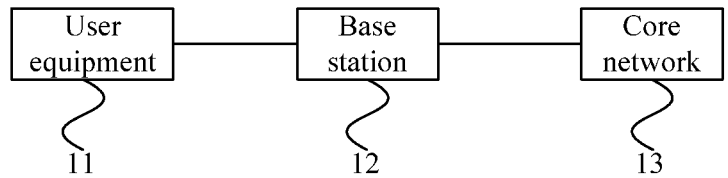
FIG. 1 is a system structural diagram of a typical communication system.

FIG. 1 is a system structural diagram of a typical communication system. As shown in FIG. 1, the communication system includes a user equipment (UE) 11 and a network side, the network side includes a base station (eNB) 12 and a core network 31, where the following technical solutions according to embodiments of the present invention are executed by the core network 31.

Embodiment 1

Figure 2:
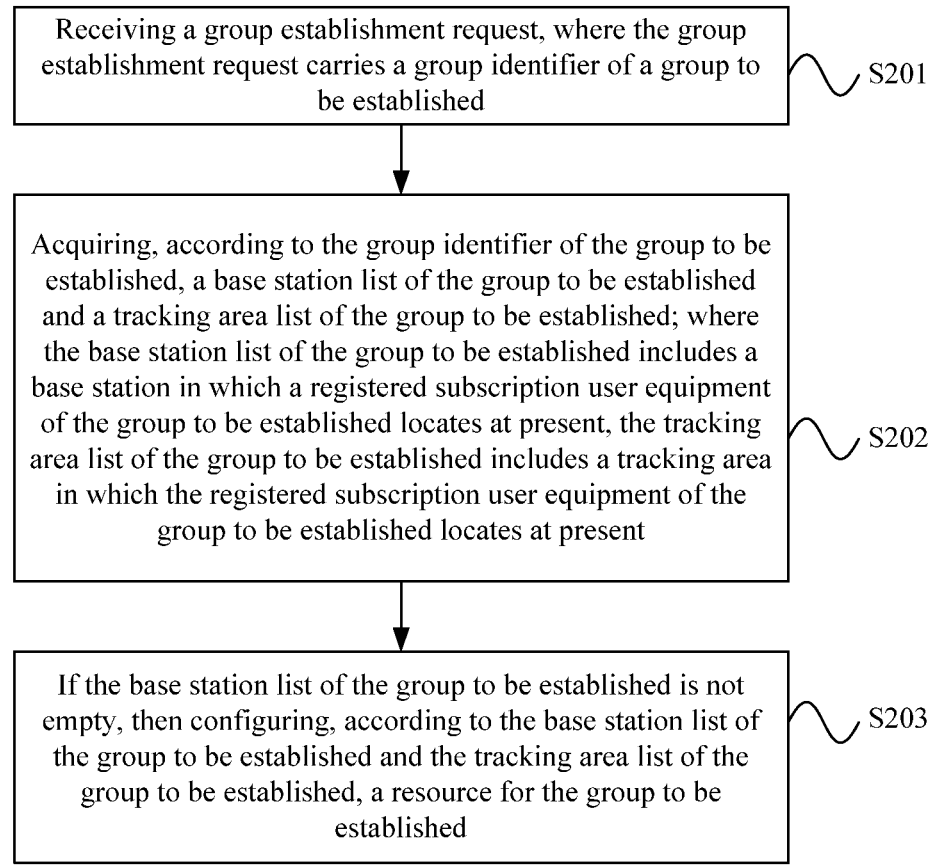
FIG. 2 is a schematic flowchart of a resource configuration method according to an embodiment of the present invention.

FIG. 2 is a schematic flowchart of a resource configuration method according to an embodiment of the present invention. As shown in FIG. 2, the resource configuration method includes:

Step S201, receiving a group establishment request, where the group establishment request carries a group identifier of a group to be established;

Step S202, acquiring, according to the group identifier of the group to be established, a base station list of the group to be established and a tracking area list of the group to be established; where the base station list of the group to be established includes a base station in which a registered subscription user equipment of the group to be established locates at present, the tracking area list of the group to be established includes a tracking area in which the registered subscription user equipment of the group to be established locates at present;

Step S203, if the base station list of the group to be established is not empty, then configuring, according to the base station list of the group to be established and the tracking area list of the group to be established, a resource for the group to be established.

Specifically, when a group needs to be established, the UE transmits to the base station the group establishment request carrying the group identifier (Group ID) of the group to be established. The core network searches, according to the group identifier of the group to be established carried in the group establishment request, a group subscription data list corresponding to the group identifier. More specifically, the core network is usually provided with a home subscriber server (HSS), the HSS serves as a data center of a communication system, and in which the group subscription data list of a group (namely an established group) which is in an activated state in the communication system and the group subscription data list of a group (namely a group to be established) which is in a non-activated state are stored. Where the group subscription data list includes identifiers of all subscription UEs in the group and an identifier of whether respective subscription UE has registered. The core network conducts screening according to the identifier of whether the subscription UE has registered in the group subscription data list of the group to be established, and generates a registered subscription UE list which includes all the registered subscription UEs.

Next, the core network determines which eNB(s) are currently accessed by the registered subscription UEs, and in which tracking area(s) (TA) under the eNB(s) the registered subscription UEs specifically locate, forms an eNB list of the group to be established according to the determined eNBs, and forms an TA list according to the determined TAs. Moreover, the TA list includes, for example, TA sub-lists respectively corresponding to each eNB in the eNB list, and the TA sub-list is used to represent that the registered subscription UE locating in the corresponding eNB specifically locates in which TA (TAs) of that eNB.

The core network configures, according to the formed eNB list and TA list of the group to be established, the group resource for the TA included in the TA list, in the eNB of the eNB list.

According to the resource configuration method of this embodiment, in responding to a group establishment request to configure a group resource, an eNB list which includes the eNB in which the registered subscription user equipment of the group to be established locates at present, and a TA list which includes the TA in which the registered subscription user equipment of the group to be established locates at present are acquired according to the group identifier of the group to be established, and the group resource is configured according to the eNB list and the TA list, thereby not only ensuring that the registered subscription UE of the group to be established can access the group successfully, but also avoiding the resource waste resulted from configuring a resource for an eNB or a TA which does not include a registered subscription UE, thus realizing a dynamic resource configuration based on the registered subscription UE.

Further, in the resource configuration method of the aforementioned embodiment, the executing, according to the base station list of the group to be established and the tracking area list of the group to be established, resource allocation for the group to be established specifically includes:

configuring a network side group resource of the group to be established for the base station in the base station list of the group to be established;

transmitting a first Push to Talk, PTT, group context setup request message to each base station in the base station list of the group to be established, where the first PTT group context setup request message carries the group identifier of the group to be established, corresponding tracking area sub-list and the network side group resource of the group to be established, so that each base station in the base station list of the group to be established responds to the first PTT group context setup request message, configures a base station side group resource for the group to be established in the tracking area of the tracking area sub-list, and broadcasts the network side group resource and the base station side group resource through the tracking area in the tracking area sub-list.

Specifically, after the core network acquires the eNB list and the TA list of the group to be established, the core network determines whether the eNB list is empty, if the eNB list is empty, namely the group has no registered subscription user at present, then returns group establishment failed prompt information; if the eNB list is not empty, then creates an enhanced-radio access bearer (E-RAB) for the group to be established The E-RAB includes an E-RAB identifier (E-RAB ID), quality of service (a QoS index), an address resolution protocol (ARP) and an allocated user plane core network side IP address and etc. The core network transmits a PTT group context setup request message (PTTSIAP_PTT_Initial_Context_Setup_Request) to each eNB in the eNB list respectively, where the PTT group context setup request message carries the E-RAB created by the core network, a group subscription property of the group to be established (for example including a group priority, a group joining identifier and a robbing right identifier and etc), the allocated user plane core network side IP address and a TA sub-list of the TA which is in the eNB and for which a group resource needs to be configured.

After the eNB receives the PTT group context setup request message, the eNB configures a base station side group resource, for example, including an eNB side group user plane IP address and a general data transmission plane (GTP) tunnel (Tunnel), for the group to be established in each TA of the TA sub-list, and broadcasts, in each TA of the TA sub-list, relevant resources and data of the group to be established, for example, including the network side group resource, the base station side group resource and the group subscription property.

The eNB returns a PTT group context setup response message (PTTSIAP_PTT_Initial_Context_Setup_Response), the PTT group context setup response message carries a corresponding base station side group resource, namely, for example, including the eNB side group user plane IP address and the GTP tunnel identifier (GTP-TEID). The core network performs corresponding configuration according to information carried in the PTT group context setup response message.

Further, in the resource configuration method of the aforementioned embodiment, after the configuring, according to the base station list of the group to be established and the tracking area list of the group to be established, the resource for the group to be established, the method further includes:

receiving group idle resource judgment triggering information;

judging, according to the group idle resource judgment triggering information, whether there exists a group idle resource or not;

if there exists, then releasing the group idle resource.

Where the group idle resource judgment triggering information, for example, includes a group joining request that the UE joins in a new subscription group from an old subscription group, an update notification message that the UE hands over from an old TA to a new TA, deregistration information that the UE deregisters from a subscription group and kill information that the UE is killed in a current TA. The core network receives the group idle resource judgment triggering information, detects whether there exists the group idle resource due to the UE departing from the old subscription group or moving out of the old TA. The group idle resource, for example, is a group resource configured in an eNB or a TA which is not accessed by any registered subscription user, or a group resource configured for the group which does not have any registered subscription user in the network. If there exists, the group idle resource is released.

The specific information type of the group idle resource judgment triggering information and the specific judging process will be illustrated in detail in the resource deletion method of the following embodiment, and is not limited in this embodiment.

According to the resource configuration method of this embodiment, corresponding judgment is executed when receiving the group idle resource judgment triggering information, so as to detect whether there exists the group idle resource, if there exists, then the group idle resource is released, thereby realizing that the group idle resource of the group is deleted according to the dynamic movement and/or the dynamic departure and so on of the registered subscription UE in the group, which not only ensures that the registered subscription UE of the group to be established can access the group successfully, but also avoids the resource waste resulted from configuring a resource for an eNB or a TA which does not include a registered subscription UE, thus realizing a dynamic resource deletion based on the registered subscription UE.

Embodiment 2

Figure 3:
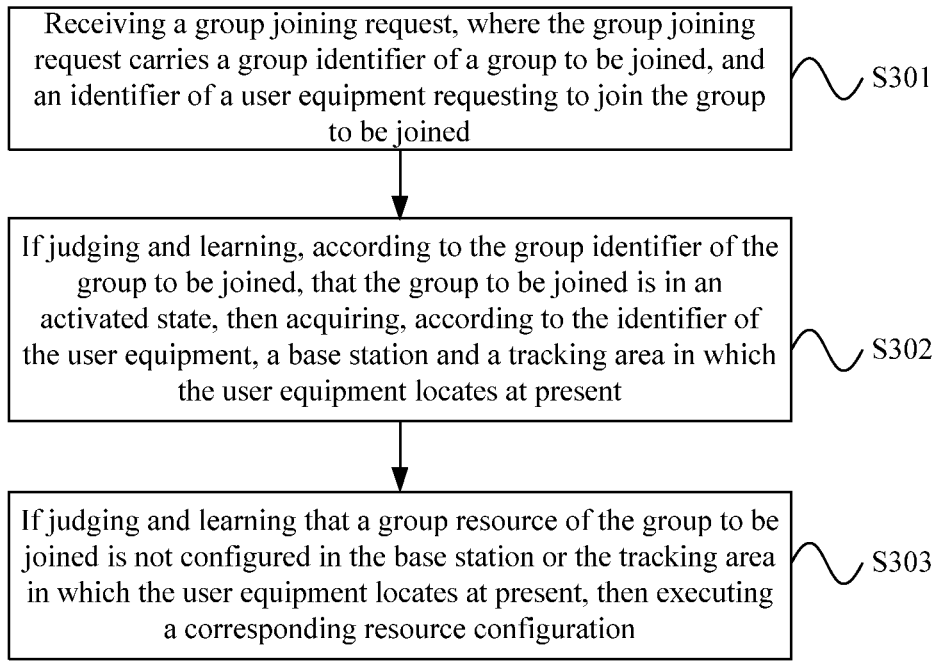
FIG. 3 is a schematic flowchart of a resource configuration method according to another embodiment of the present invention.

FIG. 3 is a schematic flowchart of a resource configuration method according to another embodiment of the present invention. As shown in FIG. 3, the resource configuration method includes:

Step S301, receiving a group joining request, where the group joining request carries a group identifier of a group to be joined, and an identifier of a user equipment requesting to join the group to be joined;

Step S302, if judging and learning, according to the group identifier of the group to be joined, that the group to be joined is in an activated state, then acquiring, according to the identifier of the user equipment, a base station and a tracking area in which the user equipment locates at present;

Step S303, if judging and learning that a group resource of the group to be joined is not configured in the base station or the tracking area in which the user equipment locates at present, then executing a corresponding resource configuration.

Specifically, when a certain UE needs to join in a certain group, the UE transmits to the base station the group joining request, the group joining request carries the group identifier of the group to be joined, and the identifier of the UE requesting to join the group to be joined. The base station forwards the group joining request to the core network.

After the core network receives the group joining request, the core network judges a current state of the group according to the group identifier of the group to be joined carried in the group joining request; if the current state of the group is an idle state (GROUP_IDLE), then it is not necessary to trigger the communication with the base station, queries a group subscription data list corresponding to the group identifier according to the group identifier, acquires a registered subscription UE list of the group to be joined from the group subscription data list, finds an identifier of the UE in the registered subscription UE list, and sets a flag corresponding to the identifier of the UE to be true (TRUE), so as to indicate that the UE has already joined in the group.

If the current state of the group is an activated state (GROUP_ESTABLISHED), then the UE queries the group subscription data list corresponding to the group identifier, acquires the registered subscription UE list of the group to be joined from the group subscription data list, finds the identifier of the UE in the registered subscription UE list, and acquires an eNB ID and a TA identifier (TAI) corresponding to the identifier of the UE, namely, determines the eNB and the TA in which the UE locates at present; sets the flag corresponding to the identifier of the UE in the registered subscription UE list to be true (TRUE), so as to indicate that the UE has already joined in the group. Then, judge whether a resource has been configured for the eNB and the TA in which the UE locates at present, if the resource has been configured, then the resource configuration is not necessary. If judging and learning that the group resource of the group to be joined is not configured in the eNB or the TA in which the UE locates at present, then executing the corresponding resource configuration.

According to the resource configuration method of the above embodiment, when the UE requests to join in the group which is in the activated state, the core network acquires the eNB and the TA in which the UE that requests to join in the group locates at present, if the group resource is not configured in the eNB or the TA, then corresponding group resource configuration is performed, which realizes that the group resource is dynamically configured according to the current location of the registered subscription UE which is dynamically added into the group, thereby not only ensuring that the registered subscription UE of the group to be established can access the group successfully, but also avoiding the resource waste resulted from configuring a resource for an eNB or a TA which does not include a registered subscription UE, thus realizing a dynamic resource configuration based on the registered subscription UE.

Further, in the resource configuration method of the aforementioned embodiment, if judging and learning that the group resource of the group to be joined is not configured in the base station or the tracking area in which the user equipment locates at present, executing the corresponding resource configuration, which specifically includes:

if judging and learning that the group resource of the group to be joined is not configured in the base station in which the user equipment locates at present, then configuring a network side group resource of the group to be joined for the base station in which the user equipment locates at present; transmitting a second PTT group context setup request message to the base station in which the user equipment locates at present, where the second PTT group context setup request message carries the group identifier of the group to be joined, an identifier of the tracking area in which the user equipment locates at present and the network side group resource of the group to be joined, so that the base station in which the user equipment locates at present responds to the second PTT group context setup request message, configures a base station side group resource for the group to be joined in the tracking area in which the user equipment locates at present, and broadcasts the network side group resource and the base station side group resource of the group to be joined through the tracking area in which the user equipment locates at present; and/or if judging and learning that the group resource of the group to be joined is already configured in the base station in which the user equipment locates at present, but the group resource of the group to be joined is not configured in the tracking area in which the user equipment locates at present, then transmitting a first modification PTT context request message to the base station in which the user equipment locates at present, where the first modification PTT context request message carries the group identifier of the group to be joined and the identifier of the tracking area in which the user equipment locates at present, so that the base station responds to the first modification PTT context request message, configures a base station side group resource in the tracking area in which the user equipment locates at present, and broadcasts the network side group resource and the base station side group resource of the group to be joined through the tracking area in which the user equipment locates at present.

Specifically, the core network, for example, queries a group dynamic data list according to the eNB ID and TAI corresponding to the UE. Where the group dynamic data list is generated by the core network after establishing the group, and the group resource of the group has been configured in which eNBs and which TAs is recorded in the group dynamic data list. The core network can learn whether the group resource has been configured in the eNB and TAI corresponding to the UE by querying the corresponding group dynamic data list.

If judging and learning that the group resource is not configured in the eNB corresponding to the UE, then the core network triggers a base station side radio resource bearer establishing process. More specifically, the core network transmits to the eNB corresponding to the UE a PTT group context setup request message, the PTT group context setup request message carries the group identifier, an E-RAB ID configured by the core network for the group, quality of service of the E-RAB, an allocated user plane core network side IP address and the TAI corresponding to the UE and etc. The eNB responds to the PTT group context setup request message, configures the base station side group resource of the group to be joined, for example, including an eNB side group user plane IP address and a GTP-TEID, for the TA corresponding to the TAI, and broadcasts, in the TA, relevant resources and data of the group, for example, including the network side group resource, the base station side group resource and the group subscription property, etc. After accomplishing the resource configuration of the TA, the eNB returns a PTT group context setup response message to the core network.

If judging and learning that the group resource is already configured in the eNB in which the UE locates at present, but the group resource is not configured in the TA corresponding to the UE in that eNB, then the core network triggers a base station side PTT context modification process. More specifically, the core network transmits to the eNB in which the UE locates at present the modification PTT context request message, the message carries the group identifier and the TAI corresponding to the UE. The eNB responds to the modification PTT context request message by configuring the group resource in the TA corresponding to the TAI and broadcasting relevant resources and data of the group in that TA, and returns to the core network a modification PTT context response message.

Further, in the resource configuration method of the aforementioned embodiment, after the executing the corresponding resource configuration, the method further includes:

receiving group idle resource judgment triggering information;

judging, according to the group idle resource judgment triggering information, whether there exists a group idle resource or not;

if there exists, then releasing the group idle resource.

Where the group idle resource judgment triggering information, for example, includes a group joining request that the UE joins in a new subscription group from an old subscription group, an update notification message that the UE hands over from an old TA to a new TA, deregistration information that the UE deregisters from a subscription group and kill information that the UE is killed in a current TA. The core network receives the group idle resource judgment triggering information, detects whether there exists the group idle resource due to the UE departing from the old subscription group or moving out of the old TA. The group idle resource, for example, is a group resource configured in an eNB or a TA which is not accessed by any registered subscription user, or a group resource configured for the group which does not have any registered subscription user in the network. If there exists, the group idle resource is released.

The specific information type of the group idle resource judgment triggering information and the specific judging process will be illustrated in detail in the resource deletion method of the following embodiment, and is not limited in this embodiment.

According to the resource configuration method of this embodiment, corresponding judgment is executed when receiving the group idle resource judgment triggering information so as to detect whether there exists the group idle resource, if there exists, then the group idle resource is released, thereby realizing that the group idle resource of the group is deleted according to the dynamic movement and/or the dynamic departure and so on of the registered subscription UE in the group, which not only ensures that the registered subscription UE of the group to be established can access the group successfully, but also avoids the resource waste resulted from configuring a resource for an eNB or a TA which does not include a registered subscription UE, thus realizing a dynamic resource deletion based on the registered subscription UE.

Embodiment 3

Figure 4:
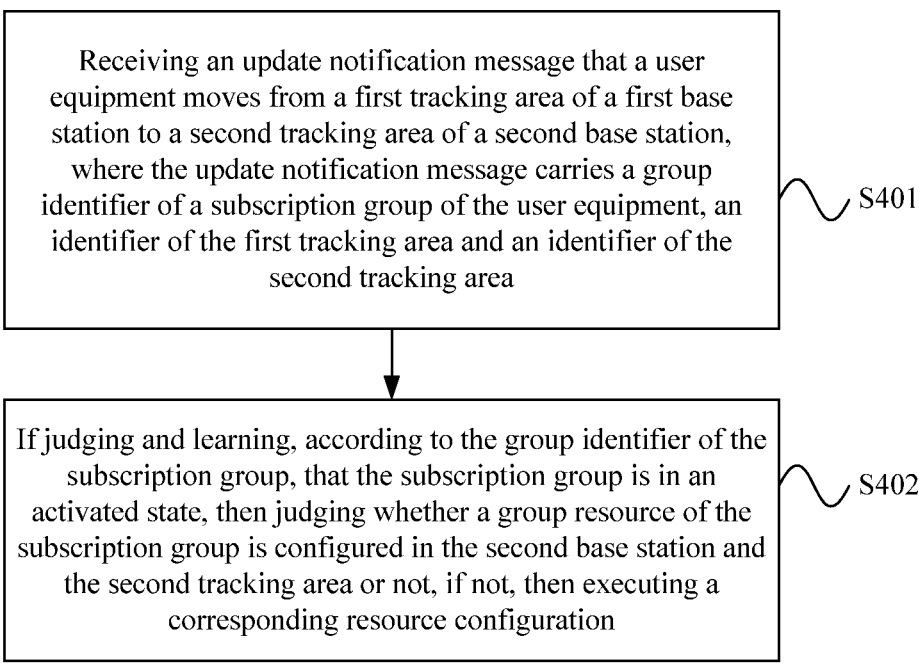
FIG. 4 is a schematic flowchart of a resource configuration method according to another embodiment of the present invention.

FIG. 4 is a schematic flowchart of a resource configuration method according to another embodiment of the present invention. As shown in FIG. 4, the resource configuration method includes:

Step S401, receiving an update notification message that a user equipment moves from a first tracking area of a first base station to a second tracking area of a second base station, where the update notification message carries a group identifier of a subscription group of the user equipment, an identifier of the first tracking area and an identifier of the second tracking area;

Step S402, if judging and learning, according to the group identifier of the subscription group, that the subscription group is in an activated state, then judging whether a group resource of the subscription group is configured in the second base station and the second tracking area or not, if not, then executing a corresponding resource configuration.

Specifically, when a certain UE moves in a network, a tracking area update or a cell handover takes place, a base station transmits to the core network a TAU update notification message or a handover notification message. In the following, an example is described where the UE locates in the first TA before the TAU or the cell handover takes place, and locates in the second TA after the TAU or the cell handover takes place. Where the first TA is in the coverage area of the first eNB, the second TA is in the coverage area of the second eNB, and the first eNB and the second eNB are the same eNB or different eNBs.

After the core network receives the TAU update notification message or the handover notification message which carries the group identifier of the subscription group of the UE, the identifier of the first TA and the identifier of the second TA, the core network judges, for example, by querying a group dynamic data list corresponding to the group identifier of the subscription group of the UE, whether the group resource of the subscription group is configured in the second eNB and the second TA, if yes, then there is no need to execute a group resource configuration, if not, then configures the corresponding group resource in the second eNB and the second TA.

According to the resource configuration method of the above embodiment, when the TAU or the cell handover takes place as a result of the mobility of the UE, the core network judges whether the group resource is configured in the eNB and the TA in which the UE locates after the UE moves, if not, then the corresponding group resource configuration is executed, thereby realizing that the group resource is dynamically configured according to the location dynamic update of the registered subscription UE, which not only ensures that the registered subscription UE of the group to be established can access the group successfully, but also avoids the resource waste resulted from configuring a resource for an eNB or a TA which does not include a registered subscription UE, thus realizing a dynamic resource configuration based on the registered subscription UE.

Further, in the resource configuration method of the aforementioned embodiment, the judging whether the group resource of the subscription group is configured in the second base station and the second tracking area or not, if not, then executing the corresponding resource configuration, specifically includes:

if judging and learning that the group resource of the subscription group is not configured in the second base station, then configuring a network side group resource of the subscription group for the second base station; transmitting a third PTT group context setup request message to the second base station, where the third PTT group context setup request message carries the group identifier of the subscription group, the identifier of the second tracking area and the network side group resource of the subscription group, so that the second base station responds to the third PTT group context setup request message, configures a base station side group resource for the subscription group in the second tracking area, and broadcasts the network side group resource and the base station side group resource of the subscription group through the second tracking area; and/or if judging and learning that the group resource of the subscription group is already configured in the second base station, but the group resource of the subscription group is not configured in the second tracking area, then transmitting a second modification PTT context request message to the second base station, where the second modification PTT context request message carries the group identifier of the subscription group and the identifier of the second tracking area, so that the second base station configures a base station side group resource in the second tracking area, and broadcasts the network side group resource and the base station side group resource of the subscription group through the second tracking area.

Specifically, the procedure that the core network executes the corresponding resource configuration according to the resource configuration condition of the second eNB and the second TA is the same as that of the Embodiment 2, the details are not described herein again.

Further, in the resource configuration method of the aforementioned embodiment, after the executing the corresponding resource configuration, the method further includes:

receiving group idle resource judgment triggering information;

judging, according to the group idle resource judgment triggering information, whether there exists a group idle resource or not;

if there exists, then releasing the group idle resource.

Where the group idle resource judgment triggering information, for example, includes a group joining request that the UE joins in a new subscription group from an old subscription group, an update notification message that the UE hands over from an old TA to a new TA, deregistration information that the UE deregisters from a subscription group and kill information that the UE is killed in a current TA. The core network receives the group idle resource judgment triggering information, detects whether there exists the group idle resource due to the UE departing from the old subscription group or moving out of the old TA. The group idle resource, for example, is a group resource configured in an eNB or a TA which is not accessed by any registered subscription user, or a group resource configured for the group which does not have any registered subscription user in the network. If there exists, the group idle resource is released.

The specific information type of the group idle resource judgment triggering information and the specific judging process will be illustrated in detail in the resource deletion method of the following embodiment, and is not limited in this embodiment.

According to the resource configuration method of this embodiment, corresponding judgment is executed when receiving the group idle resource judgment triggering information so as to detect whether there exists the group idle resource, if there exists, then the group idle resource is released, thereby realizing that the group idle resource of the group is deleted according to the dynamic movement and/or the dynamic departure and so on of the registered subscription UE in the group, which not only ensures that the registered subscription UE of the group to be established can access the group successfully, but also avoids the resource waste resulted from configuring a resource for an eNB or a TA which does not include a registered subscription UE, thus realizing a dynamic resource deletion based on the registered subscription UE.

Embodiment 4

Figure 5:
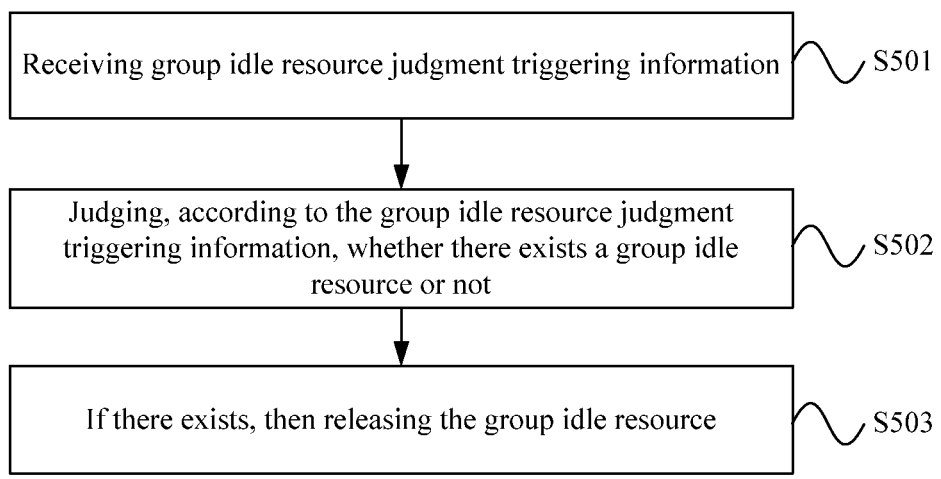
FIG. 5 is a schematic flowchart of a resource deletion method according to an embodiment of the present invention.

FIG. 5 is a schematic flowchart of a resource deletion method according to an embodiment of the present invention. As shown in FIG. 5, the resource deletion method includes:

Step S501, receiving group idle resource judgment triggering information;

Step S502, judging, according to the group idle resource judgment triggering information, whether there exists a group idle resource or not;

Step S503, if there exists, then releasing the group idle resource.

Specifically, the group idle resource judgment triggering information, for example, includes a group joining request that the UE joins in a new subscription group from an old subscription group, an update notification message that the UE hands over from an old TA to a new TA, deregistration information that the UE deregisters from a subscription group and kill information that the UE is killed in a current TA. The core network receives the group idle resource judgment triggering information, detects whether there exists the group idle resource due to the UE departing from the old subscription group or moving out of the old TA. The group idle resource, for example, is a group resource configured in an eNB or a TA which is not accessed by any registered subscription user, or a group resource configured for the group which does not have any registered subscription user in the network. If there exists, the group idle resource is released.

According to the resource deletion method of the above embodiment, corresponding judgment is executed when receiving the group idle resource judgment triggering information so as to detect whether there exists the group idle resource, if there exists, then the group idle resource is released, thereby realizing that the group idle resource of the group is deleted according to the dynamic movement and/or the dynamic departure and so on of the registered subscription UE in the group, which not only ensures that the registered subscription UE of the group to be established can access the group successfully, but also avoids the resource waste resulted from configuring a resource for an eNB or a TA which does not include a registered subscription UE, thus realizing a dynamic resource deletion based on the registered subscription UE.

Embodiment 5

Figure 6:
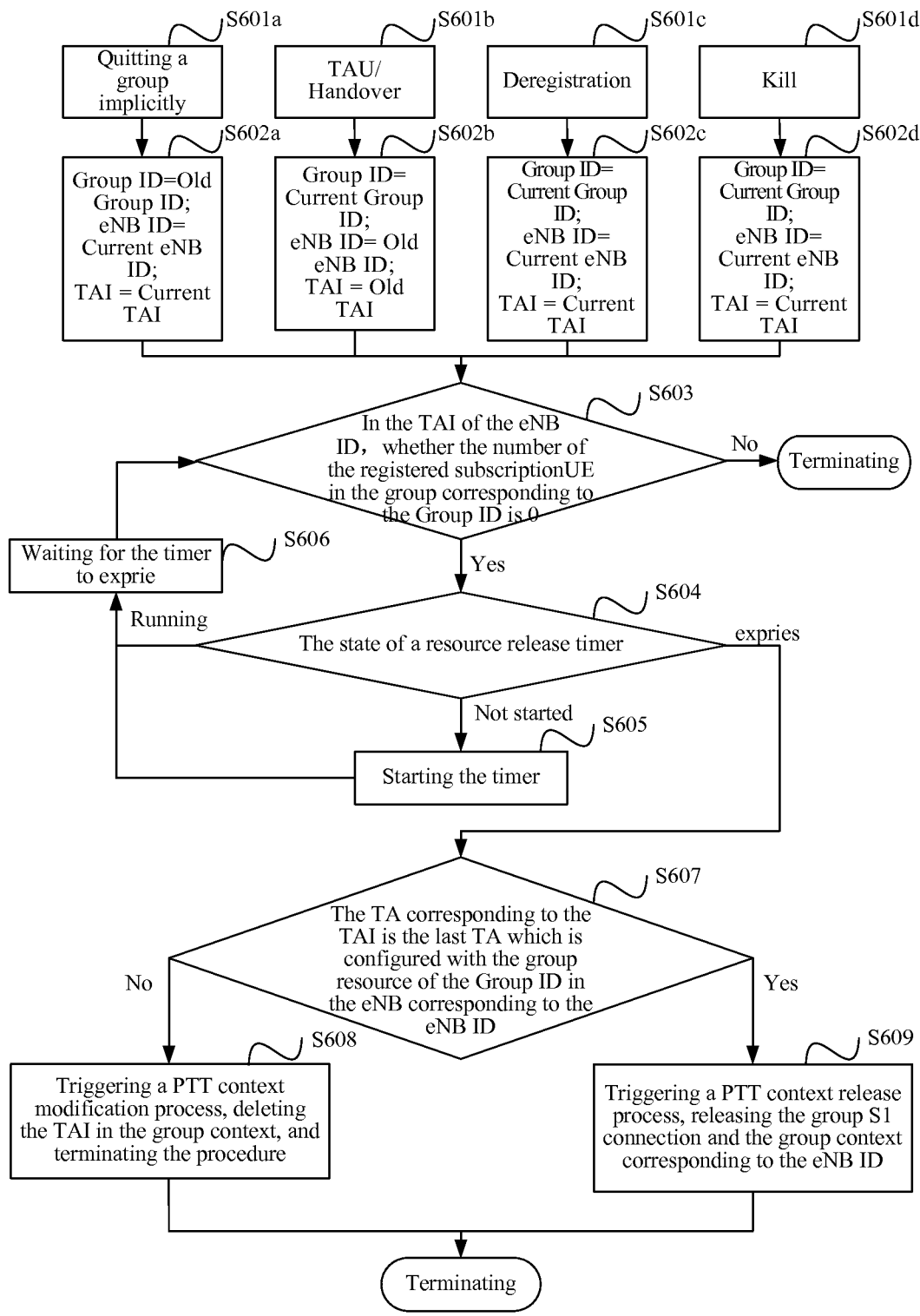
FIG. 6 is a schematic flowchart of a resource deletion method according to another embodiment of the present invention.

FIG. 6 is a schematic flowchart of a resource deletion method according to another embodiment of the present invention. Specifically, as shown in FIG. 6, the method includes the following steps:

Step S601, a UE's behavior triggers a group idle resource, more specifically, the UE's behavior includes the following four situations:

Step S601a: a UE quits a group implicitly (namely, the UE joins in a new group); where the UE transmits a group joining request when joining in the new group, the group joining request carries an identifier of the user equipment;

Step S601b: the UE executes a TAU/handover; where when the UE executes the TAU/handover, the core network receives a TAU/handover message, the TAU/handover message carries a group identifier of a subscription group of the user equipment, and an identifier of an old tracking area;

Step S601c: the UE deregisters from a current subscription group; where when the UE deregisters from the current subscription group, the core network receives deregistration information, the deregistration information carries a group identifier of the current subscription group of the user equipment, and an identifier of a tracking area in which the user equipment locates at present;

Step S601d: the UE is killed from a current TA; where when the UE is killed from the current TA, the core network receives kill information, the kill information carries the group identifier of the subscription group of the user equipment and an identifier of the current tracking area.

Step S602, determining the group identifier, a base station identifier and a tracking area identifier; more specifically, the following four situations are included:

Step S602a: if the UE quits the group implicitly, then taking an old group identifier (Old Group ID) of the UE as the group identifier, namely, let Group ID=Old Group ID; taking a current base station identifier (Current eNB ID) of the UE as the base station identifier, namely, let eNB ID=Current eNB ID; taking a current tracking area identifier (Current TAI) of the UE as the tracking area identifier, namely, let TAI=Current TAI;

Step S602b: if the UE executes the TAU/handover, then taking a current group identifier (Current Group ID) of the UE as the group identifier, namely, let Group ID=Current Group ID; taking an old base station identifier (Old eNB ID) of the UE as the base station identifier, namely, let eNB ID=Old eNB ID; taking an old tracking area identifier (Old TAI) of the UE as the tracking area identifier, namely, let TAI=Old TAI;

Step S602c: if the UE deregisters from the current subscription group, then taking a current group identifier (Current Group ID) of the UE as the group identifier, namely, let Group ID=Current Group ID; taking a current base station identifier (Current eNB ID) of the UE as the base station identifier, namely, let eNB ID=Current eNB ID; taking a current tracking area identifier (Current TAI) of the UE as the tracking area identifier, namely, let TAI=Current TAI;

Step S602d: if the UE is killed from a current TA, then taking a current group identifier (Current Group ID) of the UE as the group identifier, namely, let Group ID=Current Group ID; taking a current base station identifier (Current eNB ID) of the UE as the base station identifier, namely, let eNB ID=Current eNB ID; taking a current tracking area identifier (Current TAI) of the UE as the tracking area identifier, namely, let TAI=Current TAI.

Step S603, judging that in the determined TAI of the eNB ID, whether the number of the registered subscription UEs in the group corresponding to the Group ID is 0; if not, then terminating the procedure; if yes, then executing step S604;

Step S604, judging the state of a resource release timer, if the resource release timer is not started, then executing step S605; if the resource release timer is running, then executing step S606; if the resource release timer expires, then executing step S607;

Step S605, starting the timer; and then executing step S606;

Step S606, waiting for the timer to expire, and returning to execute step S603;

Specifically, in the duration of waiting for the timer to expire, if there is some other user joins in the group in the TAI corresponding to the eNB and in the group corresponding to the Group ID, or there is some other user hands over into the group (or TAU) (and the group that the user joins in or chooses is the group corresponding to the Group ID), then stopping the timer, and there is no need to trigger a group resource releasing process;

Step S607, judging whether the TA corresponding to the TAI is the last TA which is configured with the group resource of the Group ID in the eNB corresponding to the eNB ID; if not, then executing step S608, if yes, then executing step S609;

Step S608, triggering a PTT context modification (PTT CONTEXT Modification) process, deleting the TAI in the group context, and terminating the procedure;

Specifically, the core network transmits to the base station a modification group context message, parameters carried in the message includes: the Group ID, and the TAI of the TA whose resource is going to be deleted, a core network side S1 interface ID, a base station side S1 interface ID and etc., where the S1 interface is a communication interface used for the group between the core network and the eNB. When the base station succeeds in the deletion, returns a PTT context modification response (PTT Context Modification Response) carrying the Group ID and the TAI of the TA whose deletion is successful;

Step S609, triggering a PTT context release (PTT CONTEXT RELEASE) process, releasing the group S1 connection and the group context corresponding to the eNB ID, and terminating the procedure.

Specifically, the core network transmits to the base station a PTT context release message, parameters carried in the message includes: the Group ID, the core network side S1 interface ID and the base station side S1 interface ID. When the base station succeeds in releasing the group S1 connection and the group context corresponding to the eNB ID, returns a PTT context release response carrying the Group ID.

Embodiment 6

Figure 7:
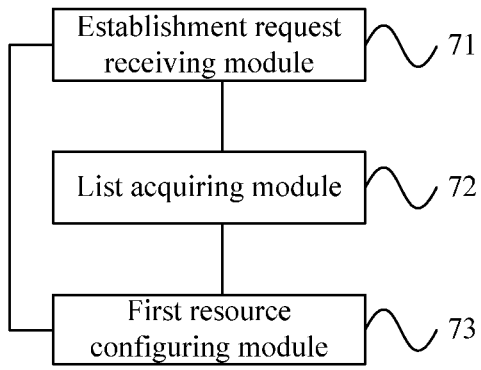
FIG. 7 is a schematic structural diagram of a resource configuration device according to an embodiment of the present invention.

FIG. 7 is a schematic structural diagram of a resource configuration device according to an embodiment of the present invention. As shown in FIG. 7, the resource configuration device includes:

an establishment request receiving module 71, configured to receive a group establishment request, where the group establishment request carries a group identifier of a group to be established;

a list acquiring module 72, configured to acquire, according to the group identifier of the group to be established, a base station list of the group to be established and a tracking area list of the group to be established; where the base station list of the group to be established includes a base station in which a registered subscription user equipment of the group to be established locates at present, the tracking area list of the group to be established includes a tracking area in which the registered subscription user equipment of the group to be established locates at present;

a first resource configuring module 73, configured to: if the base station list of the group to be established is not empty, then configure, according to the base station list of the group to be established and the tracking area list of the group to be established, a resource for the group to be established.

The resource configuration device of this embodiment may be, for example, integrated into any network device at the core network side, or provided separately, which is not limited in this embodiment.

The specific procedure of executing the resource configuration by the resource configuration device of this embodiment is the same as that of resource configuration method of the aforementioned Embodiment 1, hence the details are not described herein again.

According to the resource configuration device of this embodiment, in responding to the group establishment request to configure the group resource, an eNB list which includes an eNB in which the registered subscription user equipment of the group to be established locates at present, and a TA list which includes a TA in which the registered subscription user equipment of the group to be established locates at present are acquired according to the group identifier of the group to be established, and the group resource is configured according to the eNB list and the TA list, thereby not only ensuring that the registered subscription UE of the group to be established can access the group successfully, but also avoiding the resource waste resulted from configuring a resource for an eNB or a TA which does not include a registered subscription UE, thus realizing a dynamic resource configuration based on the registered subscription UE.

Further, in the resource configuration device of the aforementioned embodiment, the list acquiring module is specifically configured to:

acquire, according to the group identifier of the group to be established, a registered subscription user equipment list of the group to be established, where the registered subscription user equipment list of the group to be established includes the registered subscription user equipment of the group to be established;

acquire, according to the registered subscription user equipment list of the group to be established, the base station list of the group to be established;

if the base station list of the group to be established is not empty, then acquire a tracking area sub-list respectively corresponding to each base station in the base station list of the group to be established, where the tracking area sub-list includes a tracking area in which the registered subscription user equipment in the corresponding base station locates at present.

Further, in the resource configuration device of the aforementioned embodiment, the first resource configuring module is specifically configured to:

configure a network side group resource of the group to be established for the base station in the base station list of the group to be established;

transmit a first Push to Talk, PTT, group context setup request message to each base station in the base station list of the group to be established, where the first PTT group context setup request message carries the group identifier of the group to be established, corresponding tracking area sub-list and the network side group resource of the group to be established, so that each base station in the base station list of the group to be established responds to the first PTT group context setup request message, configures a base station side group resource for the group to be established in the tracking area of the tracking area sub-list, and broadcasts the network side group resource and the base station side group resource through the tracking area in the tracking area sub-list.

Further, in the resource configuration device of the aforementioned embodiment, the list acquiring module is further configured to:

if the base station list of the group to be established is empty, then return group establishment failed prompt information.

Further, the resource configuration device of the aforementioned embodiment, further includes:

a first resource deleting module, configured to receive group idle resource judgment triggering information; judge, according to the group idle resource judgment triggering information, whether there exists a group idle resource or not; if there exists, then release the group idle resource.

Embodiment 7

Figure 8:
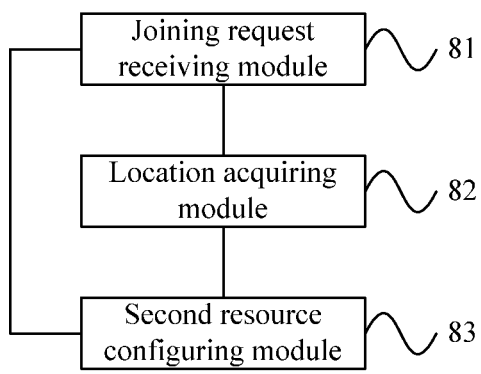
FIG. 8 is a schematic structural diagram of a resource configuration device according to another embodiment of the present invention.

FIG. 8 is a schematic structural diagram of a resource configuration device according to another embodiment of the present invention. As shown in FIG. 8, the resource configuration device includes:

a joining request receiving module 81, configured to receive a group joining request, where the group joining request carries a group identifier of a group to be joined, and an identifier of a user equipment requesting to join the group to be joined;

a location acquiring module 82, configured to: if judging and learning, according to the group identifier of the group to be joined, that the group to be joined is in an activated state, then acquire, according to the identifier of the user equipment, a base station and a tracking area in which the user equipment locates at present;

a second resource configuring module 83, configured to: if judging and learning that a group resource of the group to be joined is not configured in the base station or the tracking area in which the user equipment locates at present, then execute a corresponding resource configuration.

The resource configuration device of this embodiment may be, for example, integrated into any network device at the core network side, or provided separately, which is not limited in this embodiment.

The specific procedure of executing the resource configuration by the resource configuration device of this embodiment is the same as that of resource configuration method of the aforementioned Embodiment 2, hence the details are not described herein again.

According to the resource configuration device of the above embodiment, when the UE requests to join in the group which is in the activated state, the core network acquires the eNB and the TA in which the UE who requests to join in the group locates at present, if the group resource is not configured in the eNB or the TA, then corresponding group resource configuration is performed, which realizes that the group resource is dynamically configured according to the current location of the registered subscription UE which is dynamically added into the group, thereby not only ensuring that the registered subscription UE of the group to be established can access the group successfully, but also avoiding the resource waste resulted from configuring a resource for an eNB or a TA which does not include a registered subscription UE, thus realizing a dynamic resource configuration based on the registered subscription UE.

Further, in the resource configuration device of the aforementioned embodiment, the second resource configuring module is specifically configured to:

if judging and learning that the group resource of the group to be joined is not configured in the base station in which the user equipment locates at present, then configure a network side group resource of the group to be joined for the base station in which the user equipment locates at present; transmit a second PTT group context setup request message to the base station in which the user equipment locates at present, where the second PTT group context setup request message carries the group identifier of the group to be joined, an identifier of the tracking area in which the user equipment locates at present and the network side group resource of the group to be joined, so that the base station in which the user equipment locates at present responds to the second PTT group context setup request message, configures a base station side group resource for the group to be joined in the tracking area in which the user equipment locates at present, and broadcasts the network side group resource and the base station side group resource of the group to be joined through the tracking area in which the user equipment locates at present; and/or if judging and learning that the group resource of the group to be joined is already configured in the base station in which the user equipment locates at present, but the group resource of the group to be joined is not configured in the tracking area in which the user equipment locates at present, then transmit a first modification PTT context request message to the base station in which the user equipment locates at present, where the first modification PTT context request message carries the group identifier of the group to be joined and the identifier of the tracking area in which the user equipment locates at present, so that the base station responds to the first modification PTT context request message, configures a base station side group resource in the tracking area in which the user equipment locates at present, and broadcasts the network side group resource and the base station side group resource of the group to be joined through the tracking area in which the user equipment locates at present Further, the resource configuration device of the aforementioned embodiment, further includes:

a second resource deleting module, configured to receive group idle resource judgment triggering information; judge, according to the group idle resource judgment triggering information, whether there exists a group idle resource or not; if there exists, then release the group idle resource.

Embodiment 8

Figure 9:
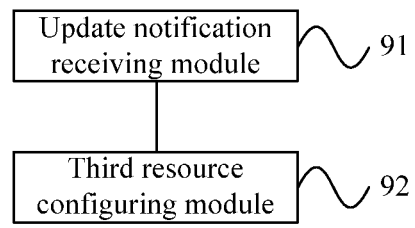
FIG. 9 is a schematic structural diagram of a resource configuration device according to another embodiment of the present invention.

FIG. 9 is a schematic structural diagram of a resource configuration device according to another embodiment of the present invention. As shown in FIG. 9, the resource configuration device includes:

an update notification receiving module 91, configured to receive an update notification message that a user equipment moves from a first tracking area of a first base station to a second tracking area of a second base station, where the update notification message carries a group identifier of a subscription group of the user equipment, an identifier of the first tracking area and an identifier of the second tracking area;

a third resource configuring module 92, configured to: if judging and learning, according to the group identifier of the subscription group, that the subscription group is in an activated state, then judge whether a group resource of the subscription group is configured in the second base station and the second tracking area, if not, then execute a corresponding resource configuration.

The resource configuration device of this embodiment may be, for example, integrated into any network device at the core network side, or provided separately, which is not limited in this embodiment.

The specific procedure of executing the resource configuration by the resource configuration device of this embodiment is the same as that of resource configuration method of the aforementioned Embodiment 3, hence the details are not described herein again.

According to the resource configuration device of this embodiment, when the TAU or the cell handover takes place as a result of the mobility of the UE, the core network judges whether the group resource is configured in the eNB and the TA in which the UE locates after the UE moves, if not, then the corresponding group resource configuration is executed, thereby realizing that the group resource is dynamically configured according to the location dynamic update of the registered subscription UE, which not only ensures that the registered subscription UE of the group to be established can access the group successfully, but also avoids the resource waste resulted from configuring a resource for an eNB or a TA which does not include a registered subscription UE, thus realizing a dynamic resource configuration based on the registered subscription UE.

Further, in the resource configuration device of the aforementioned embodiment, the first base station and the second base station are the same base station or different base stations.

Further, in the resource configuration device of the aforementioned embodiment, the third resource configuring module is specifically configured to:

if judging and learning that the group resource of the subscription group is not configured in the second base station, then configure a network side group resource of the subscription group for the second base station; transmit a third PTT group context setup request message to the second base station, where the third PTT group context setup request message carries the group identifier of the subscription group, the identifier of the second tracking area and the network side group resource of the subscription group, so that the second base station responds to the third PTT group context setup request message, configures a base station side group resource for the subscription group in the second tracking area, and broadcasts the network side group resource and the base station side group resource of the subscription group through the second tracking area; and/or if judging and learning that the group resource of the subscription group is already configured in the second base station, but the group resource of the subscription group is not configured in the second tracking area, then transmit a second modification PTT context request message to the second base station, where the second modification PTT context request message carries the group identifier of the subscription group and the identifier of the second tracking area, so that the second base station configures a base station side group resource in the second tracking area, and broadcasts the network side group resource and the base station side group resource of the subscription group through the second tracking area.

Further, the resource configuration device of the aforementioned embodiment further includes:

a third resource deleting module, configured to receive group idle resource judgment triggering information; judge, according to the group idle resource judgment triggering information, whether there exists a group idle resource or not; if there exists, then release the group idle resource.

Embodiment 9

Figure 10:
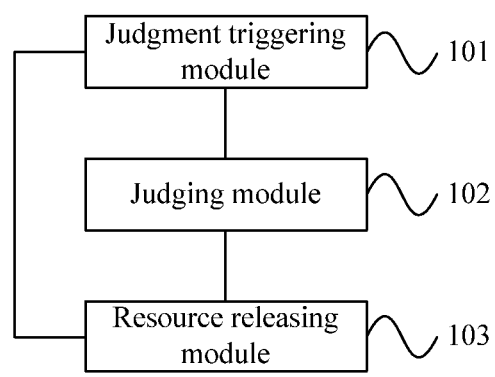
FIG. 10 is a schematic structural diagram of a resource deletion device according to an embodiment of the present invention.

FIG. 10 is a schematic structural diagram of a resource deletion device according to an embodiment of the present invention. As shown in FIG. 10, the resource deletion device includes:

a judgment triggering module 101, configured to receive group idle resource judgment triggering information;

a judging module 102, configured to judge, according to the group idle resource judgment triggering information, whether there exists a group idle resource or not;

a resource releasing module 103, configured to: if there exists, then release the group idle resource.

The resource deletion device of this embodiment may be, for example, integrated into any network device at the core network side, or provided separately, which is not limited in this embodiment.

The specific procedure of executing the resource deletion by the resource deletion device of the embodiment is the same as that of resource deletion method of the aforementioned Embodiment 4 or 5, hence the details are not described herein again.

According to the resource deletion device of this embodiment, corresponding judgment is executed when receiving the group idle resource judgment triggering information so as to detect whether there exists the group idle resource, if there exists, then the group idle resource is released, thereby realizing that the group idle resource of the group is deleted according to the dynamic movement and/or the dynamic departing and so on of the registered subscription UE in the group, which not only ensures that the registered subscription UE of the group to be established can access the group successfully, but also avoids the resource waste resulted from configuring a resource for an eNB or a TA which does not include a registered subscription UE, thus realizing a dynamic resource deletion based on the registered subscription UE.

Further, in the resource deletion device of the aforementioned embodiment, the group idle resource judgment triggering information includes a group joining request that a user equipment joins in a new subscription group from an old subscription group, where the group joining request carries an identifier of the user equipment;

Correspondingly, the judging module is specifically configured to:

acquire, according to the identifier of the user equipment, the old subscription group of the user equipment, and acquire an identifier of a base station in which the user equipment locates at present and an identifier of a tracking area in which the user equipment locates at present;

judge, according to the identifier of the base station in which the user equipment locates at present and the identifier of the tracking area in which the user equipment locates at present, whether the number of the subscribed user equipments in the old subscription group in the tracking area in which the user equipment locates at present is 0 or not;

if yes, then determine that a group resource of the old subscription group in the tracking area in which the user equipment locates at present is the group idle resource.

Further, in the resource deletion device of the aforementioned embodiment, the group idle resource judgment triggering information includes an update notification message that a user equipment hands over from an old tracking area to a new tracking area, where the update notification message carries a group identifier of a subscription group of the user equipment and an identifier of the old tracking area;

Correspondingly, the judging module is specifically configured to:

judge, according to the group identifier of the subscription group of the user equipment and the identifier of the old tracking area, whether the number of the subscribed user equipments in the subscription group of the user equipment in the old tracking area is 0 or not;

if yes, then determine that a group resource of the subscription group of the user equipment in the old tracking area is the group idle resource.

Further, in the resource deletion device of the aforementioned embodiment, the group idle resource judgment triggering information includes deregistration information that a user equipment deregisters from a subscription group, where the deregistration information carries the group identifier of the subscription group of the user equipment, and the identifier of the tracking area in which the user equipment locates at present;

Correspondingly, the judging module is specifically configured to:

judge, according to the group identifier of the subscription group of the user equipment and the identifier of the tracking area in which the user equipment locates at present, whether the number of the subscribed user equipments in the subscription group of the user equipment in the tracking area in which the user equipment locates at present is 0 or not;

if yes, then determine that a group resource of the subscription group of the user equipment in the tracking area in which the user equipment locates at present is the group idle resource.

Further, in the resource deletion device of the aforementioned embodiment, the group idle resource judgment triggering information includes kill information that a user equipment is killed in a current tracking area, where the kill information carries the group identifier of the subscription group of the user equipment and an identifier of the current tracking area;

Correspondingly, the judging module is specifically configured to:

judge, according to the group identifier of the subscription group of the user equipment and the identifier of the current tracking area, whether the number of the subscribed user equipments in the subscription group of the user equipment in the current tracking area is 0 or not;

if yes, then determine that a group resource of the subscription group of the user equipment in the current tracking area is the group idle resource.

Further, in the resource deletion device of the aforementioned embodiment, the resource releasing module is specifically configured to:

if judging and learning that a resource release timer expires and there still exists the group idle resource, then release the group idle resource, where the resource release timer starts when judging that there exists the group idle resource.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some or all of technical features thereof, without departing from the scope of the technical solutions of the embodiments of the present invention.

What is claimed is:

1. A resource configuration method used in a digital cluster communication system, comprising:
   receiving, by a core network device, a group establishment request sent by a user equipment, wherein the group establishment request carries a group identifier of a group to be established;
   acquiring, by the core network device and according to the group identifier of the group to be established, a base station list of the group to be established and a tracking area list of the group to be established; wherein the base station list of the group to be established comprises a base station in which a registered subscription user equipment of the group to be established locates at present, the tracking area list of the group to be established comprises a tracking area in which the registered subscription user equipment of the group to be established locates at present;
   when the base station list of the group to be established is not empty, configuring, by the core network device and according to the base station list of the group to be established and the tracking area list of the group to be established, a resource for the group to be established.

2. The resource configuration method according to claim 1, wherein the acquiring the base station list of the group to be established and the tracking area list of the group to be established specifically comprises:
   acquiring, by the core network device and according to the group identifier of the group to be established, a registered subscription user equipment list of the group to be established, wherein the registered subscription user equipment list of the group to be established comprises the registered subscription user equipment of the group to be established;
   acquiring, by the core network device and according to the registered subscription user equipment list of the group to be established, the base station list of the group to be established;
   when the base station list of the group to be established is not empty, acquiring, by the core network device, a tracking area sub-list respectively corresponding to each base station in the base station list of the group to be established, wherein the tracking area sub-list comprises a tracking area in which a registered subscription user equipment in a corresponding base station locates at present.

3. The resource configuration method according to claim 2, wherein the configuring, by the core network device and according to the base station list of the group to be established and the tracking area list of the group to be established, the resource for the group to be established specifically comprises:
   configuring, by the core network device, a network side group resource of the group to be established for the base station in the base station list of the group to be established;
   transmitting, by the core network device, a first Push to Talk, PTT, group context setup request message to each base station in the base station list of the group to be established, wherein the first PTT group context setup request message carries the group identifier of the group to be established, corresponding tracking area sub-list and the network side group resource of the group to be established, so that each base station in the base station list of the group to be established responds to the first PTT group context setup request message, configures a base station side group resource for the group to be established in the tracking area of the tracking area sub-list, and broadcasts the network side group resource and the base station side group resource through the tracking area in the tracking area sub-list.

4. The resource configuration method according to claim 1, after the acquiring, by the core network device and according to the group identifier of the group to be established, the base station list of the group to be established and the tracking area list of the group to be established, further comprising:
   when the base station list of the group to be established is empty, returning, by the core network device, group establishment failed prompt information.

5. The resource configuration method according to claim 1, after the configuring, by the core network device and according to the base station list of the group to be established and the tracking area list of the group to be established, the resource for the group to be established, further comprising:
   receiving, by the core network device, group idle resource judgment triggering information;
   judging, by the core network device and according to the group idle resource judgment triggering information, whether there exists a group idle resource or not;
   when there exists, releasing, by the core network device, the group idle resource.

6. A resource configuration method used in a digital cluster communication system, comprising:

receiving, by a core network device, a group joining request sent by a user equipment, wherein the group joining request carries a group identifier of a group to be joined, and an identifier of a user equipment requesting to join the group to be joined;

when judging and learning, according to the group identifier of the group to be joined, that the group to be joined is in an activated state, acquiring, by the core network device and according to the identifier of the user equipment, a base station and a tracking area in which the user equipment locates at present;

when judging and learning that a group resource of the group to be joined is not configured in the base station or the tracking area in which the user equipment locates at present, executing, by the core network device, a corresponding resource configuration.

7. The resource configuration method according to claim 6, wherein the when judging and learning that the group resource of the group to be joined is not configured in the base station or the tracking area in which the user equipment locates at present, executing, by the core network device, the corresponding resource configuration, specifically comprises:

when judging and learning that the group resource of the group to be joined is not configured in the base station in which the user equipment locates at present, configuring, by the core network device, a network side group resource of the group to be joined for the base station in which the user equipment locates at present; transmitting a second PTT group context setup request message to the base station in which the user equipment locates at present, wherein the second PTT group context setup request message carries the group identifier of the group to be joined, an identifier of the tracking area in which the user equipment locates at present and the network side group resource of the group to be joined, so that the base station in which the user equipment locates at present responds to the second PTT group context setup request message, configures a base station side group resource for the group to be joined in the tracking area in which the user equipment locates at present, and broadcasts the network side group resource and the base station side group resource of the group to be joined through the tracking area in which the user equipment locates at present; and/or when judging and learning that the group resource of the group to be joined is already configured in the base station in which the user equipment locates at present, but the group resource of the group to be joined is not configured in the tracking area in which the user equipment locates at present, transmitting, by the core network device, a first modification PTT context request message to the base station in which the user equipment locates at present, wherein the first modification PTT context request message carries the group identifier of the group to be joined and the identifier of the tracking area in which the user equipment locates at present, so that the base station responds to the first modification PTT context request message, configures a base station side group resource in the tracking area in which the user equipment locates at present, and broadcasts the network side group resource and the base station side group resource of the group to be joined through the tracking area in which the user equipment locates at present.

8. A resource configuration method used in a digital cluster communication system, comprising:

receiving, by a core network device, an update notification message that a user equipment moves from a first tracking area of a first base station to a second tracking area of a second base station, wherein the update notification message is sent by a base station and carries a group identifier of a subscription group of the user equipment, an identifier of the first tracking area and an identifier of the second tracking area;

when judging and learning, according to the group identifier of the subscription group, that the subscription group is in an activated state, judging whether a group resource of the subscription group is configured in the second base station and the second tracking area or not, when not, executing, by the core network device, a corresponding resource configuration.

9. The resource configuration method according to claim 8, wherein the first base station and the second base station are the same base station or different base stations.

10. The resource configuration method according to claim 8, wherein the judging whether the group resource of the subscription group is configured in the second base station and the second tracking area or not, when not, executing, by the core network device, the corresponding resource configuration, specifically comprises:

when judging and learning that the group resource of the subscription group is not configured in the second base station, configuring a network side group resource of the subscription group for the second base station; transmitting, by the core network device, a third PTT group context setup request message to the second base station, wherein the third PTT group context setup request message carries the group identifier of the subscription group, the identifier of the second tracking area and the network side group resource of the subscription group, so that the second base station responds to the third PTT group context setup request message, configures a base station side group resource for the subscription group in the second tracking area, and broadcasts the network side group resource and the base station side group resource of the subscription group through the second tracking area; and/or when judging and learning that the group resource of the subscription group is already configured in the second base station, but the group resource of the subscription group is not configured in the second tracking area, transmitting, by the core network device, a second modification PTT context request message to the second base station, wherein the second modification PTT context request message carries the group identifier of the subscription group and the identifier of the second tracking area, so that the second base station configures a base station side group resource in the second tracking area, and broadcasts the network side group resource and the base station side group resource of the subscription group through the second tracking area.

11. A resource configuration device used in a digital cluster communication system, wherein the resource configuration device is a core network device and comprises a processor executing program codes stored in a non-transitory processor-readable medium, which configures the resource configuration device to:

receive a group establishment request sent by a user equipment, wherein the group establishment request carries a group identifier of a group to be established;

acquire, according to the group identifier of the group to be established, a base station list of the group to be established and a tracking area list of the group to be established; wherein the base station list of the group to be established comprises a base station in which a registered subscription user equipment of the group to be established locates at present, the tracking area list of the group to be established comprises a tracking area in which the registered subscription user equipment of the group to be established locates at present;

when the base station list of the group to be established is not empty, configure, according to the base station list of the group to be established and the tracking area list of the group to be established, a resource for the group to be established.

12. The resource configuration device according to claim 11, wherein the resource configuration device is specifically configured to:

acquire, according to the group identifier of the group to be established, a registered subscription user equipment list of the group to be established, wherein the registered subscription user equipment list of the group to be established comprises the registered subscription user equipment of the group to be established;

acquire, according to the registered subscription user equipment list of the group to be established, the base station list of the group to be established;

when the base station list of the group to be established is not empty, acquire a tracking area sub-list respectively corresponding to each base station in the base station list of the group to be established, wherein the tracking area sub-list comprises a tracking area in which a registered subscription user equipment in a corresponding base station locates at present;

wherein the resource configuration device is specifically configured to:

configure a network side group resource of the group to be established for the base station in the base station list of the group to be established;

transmit a first Push to Talk, PTT, group context setup request message to each base station in the base station list of the group to be established, wherein the first PTT group context setup request message carries the group identifier of the group to be established, corresponding tracking area sub-list and the network side group resource of the group to be established, so that each base station in the base station list of the group to be established responds to the first PTT group context setup request message, configures a base station side group resource for the group to be established in the tracking area of the tracking area sub-list, and broadcasts the network side group resource and the base station side group resource through the tracking area in the tracking area sub-list.

13. The resource configuration device according to claim 11, wherein the resource configuration device is further configured to:

when the base station list of the group to be established is empty, return group establishment failed prompt information.

14. The resource configuration device according to claim 11, wherein the resource configuration device is further configured to:

receive group idle resource judgment triggering information; judge, according to the group idle resource judgment triggering information, whether there exists a group idle resource or not; when there exists, release the group idle resource.

15. A resource configuration device used in a digital cluster communication system, wherein the resource configuration device is a core network device and comprises a processor executing program codes stored in a non-transitory processor-readable medium, which configures the resource configuration device to:

receive a group joining request sent by a user equipment, wherein the group joining request carries a group identifier of a group to be joined, and an identifier of a user equipment requesting to join the group to be joined;

when judging and learning, according to the group identifier of the group to be joined, that the group to be joined is in an activated state, acquire, according to the identifier of the user equipment, a base station and a tracking area in which the user equipment locates at present;

when judging and learning that a group resource of the group to be joined is not configured in the base station or the tracking area in which the user equipment locates at present, execute a corresponding resource configuration.

16. The resource configuration device according to claim 15, wherein the resource configuration device is specifically configured to:

when judging and learning that the group resource of the group to be joined is not configured in the base station in which the user equipment locates at present, configure a network side group resource of the group to be joined for the base station in which the user equipment locates at present; transmit a second PTT group context setup request message to the base station in which the user equipment locates at present, wherein the second PTT group context setup request message carries the group identifier of the group to be joined, an identifier of the tracking area in which the user equipment locates at present and the network side group resource of the group to be joined, so that the base station in which the user equipment locates at present responds to the second PTT group context setup request message, configures a base station side group resource for the group to be joined in the tracking area in which the user equipment locates at present, and broadcasts the network side group resource and the base station side group resource of the group to be joined through the tracking area in which the user equipment locates at present; and/or when judging and learning that the group resource of the group to be joined is already configured in the base station in which the user equipment locates at present, but the group resource of the group to be joined is not configured in the tracking area in which the user equipment locates at present, transmit a first modification PTT context request message to the base station in which the user equipment locates at present, wherein the first modification PTT context request message carries the group identifier of the group to be joined and the identifier of the tracking area in which the user equipment locates at present, so that the base station responds to the first modification PTT context request message, configures a base station side group resource in the tracking area in which the user equipment locates at present, and broadcasts the network side group resource and the base station side group resource of the group to be joined through the tracking area in which the user equipment locates at present.

17. A resource configuration device used in a digital cluster communication system, wherein the resource configuration device is a core network device and comprises a processor executing program codes stored in a non-transitory processor-readable medium, which configures the resource configuration device to:
receive an update notification message that a user equipment moves from a first tracking area of a first base station to a second tracking area of a second base station, wherein the update notification message is sent by a base station and carries a group identifier of a subscription group of the user equipment, an identifier of the first tracking area and an identifier of the second tracking area;
when judging and learning, according to the group identifier of the subscription group, that the subscription group is in an activated state, judge whether a group resource of the subscription group is configured in the second base station and the second tracking area, when not, execute a corresponding resource configuration.

18. The resource configuration device according to claim 17, wherein the first base station and the second base station are the same base station or different base stations.

19. The resource configuration device according to claim 17, wherein the resource configuration device is specifically configured to:
when judging and learning that the group resource of the subscription group is not configured in the second base station, configure a network side group resource of the subscription group for the second base station; transmit a third PTT group context setup request message to the second base station, wherein the third PTT group context setup request message carries the group identifier of the subscription group, the identifier of the second tracking area and the network side group resource of the subscription group, so that the second base station responds to the third PTT group context setup request message, configures a base station side group resource for the subscription group in the second tracking area, and broadcasts the network side group resource and the base station side group resource of the subscription group through the second tracking area; and/or when judging and learning that the group resource of the subscription group is already configured in the second base station, but the group resource of the subscription group is not configured in the second tracking area, transmit a second modification PTT context request message to the second base station, wherein the second modification PTT context request message carries the group identifier of the subscription group to be joined and the identifier of the second tracking area, so that the second base station configures a base station side group resource in the second tracking area, and broadcasts the network side group resource and the base station side group resource of the subscription group through the second tracking area.

* * * * *